(12) United States Patent
Winklhofer

(10) Patent No.: US 7,928,641 B2
(45) Date of Patent: Apr. 19, 2011

(54) SPARK PLUG

(75) Inventor: Ernst Winklhofer, Hohenburg (AT)

(73) Assignee: AVL List GmbH, Graz (AT)

( * ) Notice: Subject to any disclaimer, the term of this patent is extended or adjusted under 35 U.S.C. 154(b) by 308 days.

(21) Appl. No.: 12/073,700

(22) Filed: Mar. 7, 2008

(65) Prior Publication Data

US 2008/0218052 A1    Sep. 11, 2008

(30) Foreign Application Priority Data

Mar. 8, 2007  (AT) .................................. A 367/2007

(51) Int. Cl.
  *F02M 57/06* (2006.01)
(52) U.S. Cl. ........................................ 313/118; 313/143
(58) Field of Classification Search ................... 313/118; 73/714
  See application file for complete search history.

(56) References Cited

U.S. PATENT DOCUMENTS

| 5,726,351 | A | | 3/1998 | Glaser |
| 6,094,990 | A | * | 8/2000 | Lykowski et al. ................ 73/714 |
| 6,597,088 | B1 | | 7/2003 | Glaser et al. |
| 7,022,968 | B1 | * | 4/2006 | Hopper et al. ................. 250/215 |

FOREIGN PATENT DOCUMENTS

| AT | 002228 | 6/1998 |
| AT | 003845 | 8/2000 |

* cited by examiner

*Primary Examiner* — Nimeshkumar D Patel
*Assistant Examiner* — Mary Ellen Bowman
(74) *Attorney, Agent, or Firm* — Dykema Gossett PLLC

(57) ABSTRACT

A spark plug includes a longitudinal bore formed in a housing for receiving an insulator, with the housing having a first bore for receiving a pressure measuring device and a second bore for receiving a light guide which opens into the combustion chamber.

7 Claims, 2 Drawing Sheets

SPARK PLUG

BACKGROUND OF THE INVENTION

1. Field of the Invention

The invention relates to a spark plug, comprising a longitudinal bore formed in a housing for receiving an insulator, with the housing having a first bore for receiving a pressure measuring device.

2. The Prior Art

A spark plug with a continuous longitudinal bore arranged off-center in the housing for receiving an insulator is known from AT 407.577 B. The spark plug comprises housing regions of different wall thicknesses, with a pressure measuring device being arranged in a region of larger wall thickness. The bore for receiving the pressure measuring device is arranged in an inclined manner with respect to the longitudinal bore.

A spark plug for internal combustion engines is known from AT 002.228 U1 which comprises an optical sensor integrated in the spark plug with several light guides opening into the combustion chamber. The light guides are arranged concentrically around the axis of the middle electrode. A group each of bores extending parallel to the axis of the spark plug open into a collecting bore arranged as a pocket hole. The optical connection is made via light guide cables and the light guides opening into the combustion chamber via the collecting bore and the bores.

AT 003.845 U1 describes an optoelectronic measuring device for detecting combustion processes in the combustion chamber of an internal combustion engine in operation, with the optical sensors being arranged in a component which is essentially cylindrical and opens into the combustion chamber and the sensor ends are substantially arranged radially on the jacket of the component. The component can be arranged as a spark plug for example.

A spark plug with a force-measuring element for measuring the pressure applied to the spark plug is further known from AT 402.116 B, with the insulating body of the spark plug resting on the spark plug housing by interposing the force-measuring element when pressure is applied in the axial direction.

Known spark plugs are thus combined either with a pressure sensor or an optical sensor. It was not known or even regarded as feasible to house and produce both an optical sensor as well as a pressure sensor in a spark plug.

A parallel optical measurement and pressure measurement is inevitable in order to enable the monitoring of combustion processes in real time. As a result of the compact arrangement of the charge-changing valves, the injection devices and the spark plugs, it is increasingly difficult to arrange additional bores in the cylinder head for the optical monitoring of the combustion chamber and/or the pressure monitoring of the combustion chamber. That is why it is desirable to keep the number of measuring bores as low as possible. One possibility of avoiding these additional bores is to adapt an additional measuring function in the spark plug.

It would be desirable to perform pressure measurement and light measurement at the same point in order to offer a high amount of significance in the evaluation of combustion processes.

It is the object of the invention to further develop a spark plug of the kind mentioned above in such a way that connection dimensions of a conventional spark plug are achieved and optical measurements and piezoelectric pressure measurements can be performed in parallel.

SUMMARY OF THE INVENTION

This is achieved in accordance with the invention in that a second bore is arranged in the housing for receiving a light guide which opens into the combustion chamber, with preferably the axis of the second bore being arranged in a skewed manner relative to the axis of the first bore, preferably skewed relative to the spark plug axis.

As a result of the skewed arrangement of first and second bore, an excessive reduction of the wall thickness is avoided, so that the thermal and mechanical tensions in the housing will not exceed a permissible value.

It is especially advantageous when the first bore encloses with the spark plug axis an angle of approximately 0° to 15°, preferably 3° to 7°, with preferably the axis of the first spanning a plane with the axis of the longitudinal bore. When seen in a plan view of the spark plug axis, the second bore encloses an angle of $\leqq 25°$ with the plane, preferably 0° to 22°. It is preferably provided that the axis of the second bore encloses an angle of $\leqq 10°$, preferably $\leqq 5°$, with a straight line projected by the spark plug axis. The inclined arrangement of the first and second bore comes with the advantage that the upper part of the spark plug provides sufficient space for the optical and electric connections.

The longitudinal bore can extend parallel to the spark plug axis and can be spaced from the cylinder axis. As a result, housing regions are formed with different wall thicknesses. It is advantageously provided that the first bore and/or the second bore is/are arranged in a region of the housing which has the largest wall thickness with respect to the longitudinal bore.

The invention is explained below in greater detail by reference to the drawings.

DETAILED DESCRIPTION OF THE PREFERRED EMBODIMENT

Figure 1:
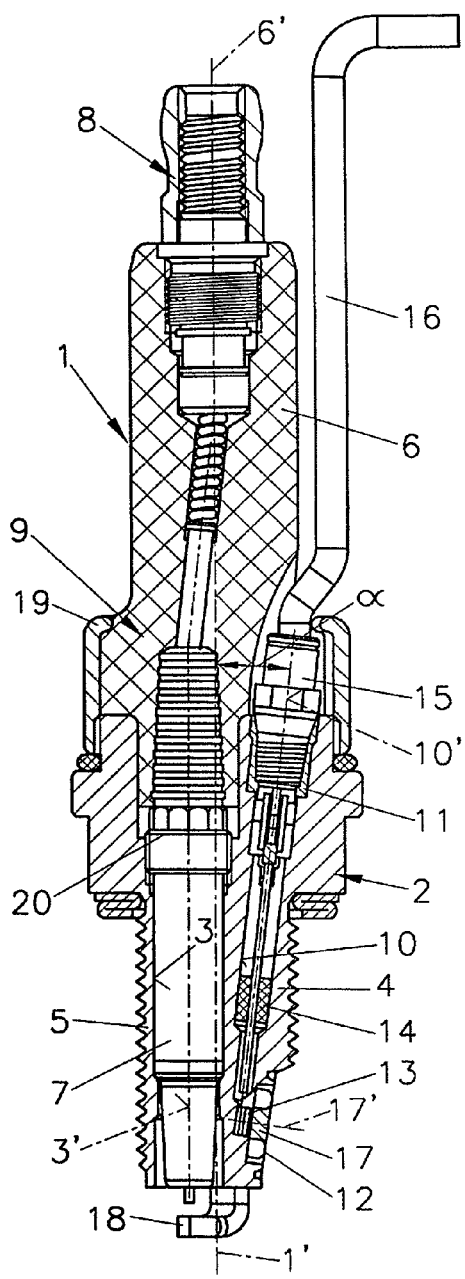
FIG. 1 shows the spark plug in accordance with the invention in a longitudinal sectional view.
Figure 2:
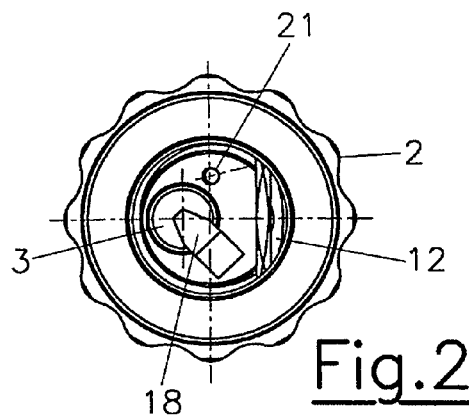
FIG. 2 shows the spark plug in a front view on the electrode side.
Figure 3:
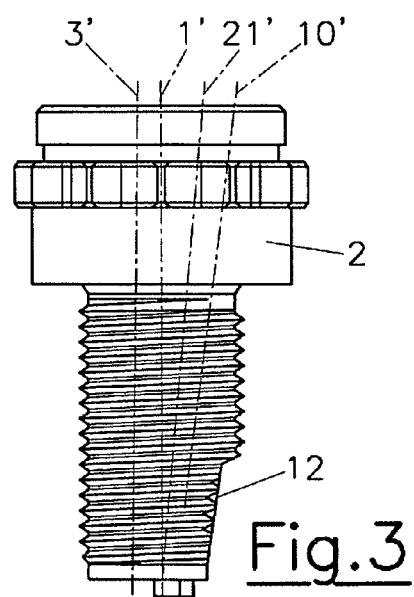
FIG. 3 shows a housing of a spark plug in a side view.

FIG. 1 shows a spark plug 1 with a continuous longitudinal bore 3 which is arranged off-center in the housing 2. As a result of the off-center arrangement of the longitudinal bore 3, housing regions of different wall thickness are obtained, with the region of the larger wall thickness being designated with reference numeral 4 and the one with the lower wall thickness being designated with reference numeral 5. The insulator 9 of the spark plug 1 is arranged in several parts and has an upper insulator part 6 with a high-voltage connection 8 and a bottom insulator part 7 which faces the combustion chamber. The axis 3' of the longitudinal bore 3 is spaced from the axis 1' of spark plug 1 and in this embodiment is parallel to the same. Axis 3' of the longitudinal bore 3 can also be arranged inclined to the spark plug axis 1', so that the spark plug tip or its electrode 18 can approach the spark plug axis 1'.

Axis 6' of the upper insulator part 6 on the other hand coincides with the spark plug axis 1', so that the upper insulator part 6 or at least the portion of the upper insulator part 6 which is used for connecting the spark-plug connector or the spark coil can be radially symmetrical and in its dimensions substantially the same as in a conventional spark plug. As a result, ease of use is ensured without any additional auxiliary means or adapter parts.

In the region 4 of larger wall thickness of the housing 2, a lateral first bore 10 for receiving a pressure measuring device 11 is provided adjacent to the longitudinal bore 3 for receiving the bottom insulator part 7, which first bore 10 can be inclined at an angle $\alpha$ of up to 15° relative to the spark plug axis 1'. Angles $\alpha$ of approximately 3° to 7° are advantageously used because the available space in housing 2 can be utilized optimally through a slight inclination and the mounting of the pressure measuring device 11 is facilitated. For example, after the removal of cap 19 with which the upper insulator part 6 is fastened to the housing 2 via a screwed connection for example, the first bore 10 can be made accessible. The bottom insulator part 7 is tightly held in housing 2 by the insulator screw 20.

In the illustrated embodiment, the pressure measuring device 11 comprises a pressure measuring element 13 which is arranged in a recess 12 of housing 2 of spark plug 1 on the side of the combustion chamber. Recess 12 is in direct connection with the combustion chamber of the internal combustion engine. The signal conduction 14 is guided in the first bore 10 and connects the pressure measuring elements 13 with a connection 15 for the measuring cable 16.

The pressure measuring element 13 has a piezoelectric element which is pressurized by a sensor membrane 17, with the central axis 17' of the sensor membrane 17 standing substantially normal to the axis 10' of the first bore in the illustrated embodiment. It is understood that it is also possible within the scope of the invention to provide different orientations of the sensor membrane, which especially also includes a membrane that faces directly below to the combustion chamber.

In the region 4 of the largest wall thickness of housing 2, a second bore 21 for receiving a light-conducting element is arranged adjacent to the first bore 10. The second bore 21 opens close to electrode 18 into the combustion chamber.

Figure 4:
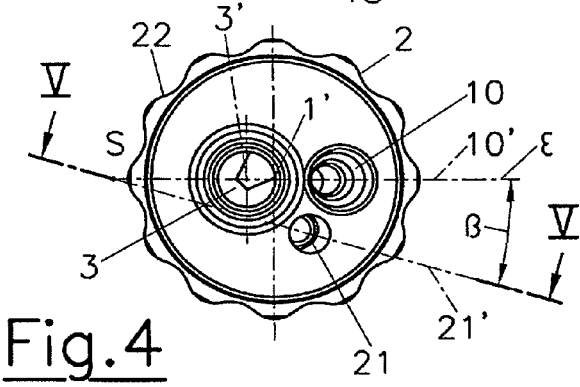
FIG. 4 shows the housing in top view.
Figure 5:
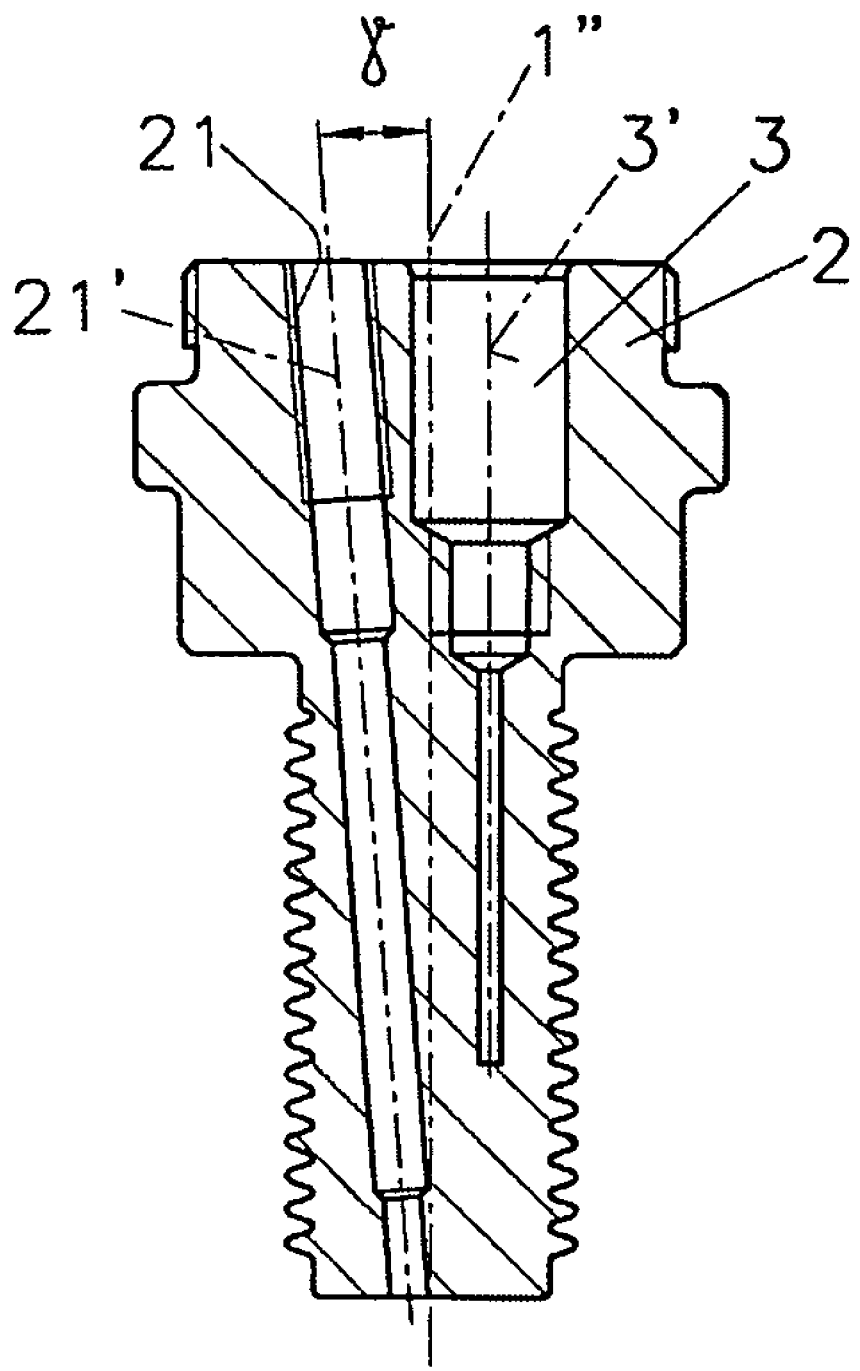
FIG. 5 shows the housing in a sectional view along the line V-V in FIG. 4.

Axis 10' of first bore 10 opens with axis 3' of the longitudinal bore 3 a plane $\epsilon$, with preferably the cylinder axis 1' extending in the plane E. Axis 21' of the second bore 21 is arranged in a skewed manner relative to the axis 10' of the first bore 10 and relative to the spark plug axis 1' and relative to the axis 3' of the longitudinal bore 3 and intersects the plane $\epsilon$ at a point 2 which in the illustrated embodiment, when seen in a plan view of housing 2 as shown in FIG. 4, lies outside of the profile 22 of spark plug 1. Axis 21' of the second bore 21 has an angle $\beta$ of $\leq 25°$, preferably 0° to 22° relative to the plane $\epsilon$. With a straight line 1" as projected from the spark plug axis 1', the axis 21' of second bore 21 encloses an angle $\gamma$ of $\leq 10°$, preferably $\leq 5°$.

Through the described arrangement of the first and second bore 10, 21 and the longitudinal bore 3, production-related, mechanical and thermal problems can be substantially avoided, with the spark plug 1, with which optical and pressure measurements can be performed simultaneously in the combustion chamber, corresponding with respect to its size to a standard spark plug.

The invention claimed is:

1. A spark plug, comprising a longitudinal bore formed in a housing for receiving an insulator, with the housing having a first bore containing a pressure measuring device, wherein a second bore is arranged in the housing containing a light guide which opens into a combustion chamber, wherein an axis of the second bore is arranged in a skewed manner relative to an axis of the first bore and relative to a spark plug axis, wherein the axis of the first bore spans a plane with the axis of the longitudinal bore and, when seen in a plan view of the spark plug axis, the axis of the second bore encloses an angle of $\leq 25°$ with the plane, and wherein the axis of the first bore encloses with the spark plug axis an angle of 0° to 15°.

2. The spark plug according to claim a 1, wherein the axis of the first bore encloses with the spark plug axis an angle of 3° to 7°.

3. The spark plug according to claim 1, wherein, when seen in a plan view of the spark plug axis, the axis of the second bore encloses an angle of 0° to 22° with the plane.

4. The spark plug according to claim 1, wherein a longitudinal bore is arranged parallel to the spark plug axis, with the axis of the longitudinal bore being spaced from the spark plug axis.

5. The spark plug according to claim 1, wherein the first bore and/or the second bore is/are arranged in a region of the housing which has a largest wall thickness with respect to the longitudinal bore.

6. The spark plug according to claim 1, wherein the axis of the second bore encloses an angle of $\leq 10°$ with a straight line projected from the spark plug axis.

7. The spark plug according to claim 6, wherein the axis of the second bore encloses an angle of $\leq 5°$ with a straight line projected from the spark plug axis.

* * * * *